APPARATUS FOR REPRODUCING VIDEO TAPE RECORDINGS IN SLOW MOTION

Filed Sept. 8, 1966 7 Sheets-Sheet 1

INVENTOR.
JOHN L.E. BALDWIN
BY
Frank R. Jeifari
AGENT

INVENTOR.
JOHN LE. BALDWIN
BY
[signature]
AGENT

March 31, 1970 J. L. E. BALDWIN 3,504,119

APPARATUS FOR REPRODUCING VIDEO TAPE RECORDINGS IN SLOW MOTION

Filed Sept. 8, 1966 7 Sheets-Sheet 3

INVENTOR.
JOHN L.E. BALDWIN

BY
Frank R. Trifari

AGENT

APPARATUS FOR REPRODUCING VIDEO TAPE RECORDINGS IN SLOW MOTION

*INVENTOR.*
JOHN L.E. BALDWIN
*BY*
Frank R. Jufani
AGENT

INVENTOR.
JOHN L. E. BALDWIN
BY
Frank R. Jifani
AGENT

March 31, 1970 J. L. E. BALDWIN 3,504,119

APPARATUS FOR REPRODUCING VIDEO TAPE RECORDINGS IN SLOW MOTION

Filed Sept. 8, 1966 7 Sheets-Sheet 6

INVENTOR.
JOHN L.E. BALDWIN
BY
Frank R. Trifari
AGENT

APPARATUS FOR REPRODUCING VIDEO TAPE RECORDINGS IN SLOW MOTION

Filed Sept. 8, 1966 7 Sheets-Sheet 7

INVENTOR.
JOHN L. E. BALDWIN
BY
Frank R. Trifari
AGENT

United States Patent Office 3,504,119

Patented Mar. 31, 1970

3,504,119

APPARATUS FOR REPRODUCING VIDEO TAPE RECORDINGS IN SLOW MOTION

John Lewis Edward Baldwin, Croydon, England, assignor, by mesne assignments, to U.S. Philips Corporation, New York, N.Y., a corporation of Delaware Filed Sept. 8, 1966, Ser. No. 578,065
Claims priority, application Great Britain, Sept. 10, 1965, 38,854/65
Int. Cl. H04n 1/28, 1/24
U.S. Cl. 178—6.6 7 Claims

ABSTRACT OF THE DISCLOSURE

Video tape reproducing apparatus for producing slow motion pictures from recorded video tape using an assembly of $n$ reproducing heads staggered along a helical path or a rotor having a larger diameter than the recording rotor, where the tape passes over the rotor at an angle depending on the ratio of the angular speeds of rotation of the recording and reproducing rotors.

The invention relates to apparatus for reproducing video tape recordings. More particularly, the invention relates to reproduction at slow speed with apparatus and recordings especially (though not exclusively) of the helical type wherein each track contains one field.

There is a requirement for a device which will accept normal television pictures and reproduce them at a reduced speed so providing slow motion. Slow motion using film is a well-known technique for the analysis of movement and in trick photography to alter the apparent size of objects being affected by the force of gravity.

Any device producing slow motion must, by definition, inevitably store information.

The magnetic recording of television signals is now standard practice and for monochrome use is now approaching perfection. The provision of slow motion has, however, been neglected with a few exceptions. The first was by the American Broadcasting Company in conjunction with Ampex. The principle used was to slow the whole operation of the magnetic reproducing equipment down to either a half or a quarter speed and to reproduce the picture on a special monitor capable of operating at 525 lines, 15 or 7½ frames per second. A camera operating at 525 lines, 30 frames per second converted the picture on the monitor to the normal U.S.A. television standards. The results were not satisfactory; smearing and flicker were apparent at half speed and at a quarter speed the flicker was intolerable.

In 1964, N.H.K. of Japan produced some equipment used at the Olympic Games. Results were satisfactory, but the price was £100,000. Some other Japanese equipment has been made selling for about £50,000.

The work done so far has been based on quadruplex machines although the second Japanese machine used a helical recorder as an intermediate store.

The problem of providing slow motion will now be described with reference to FIGURE 6 of the accompanying diagrammatic drawings as applied to helical recorders.

It would appear at first sight that all that is needed to obtain slow motion from a helical recorder is to decrease the speed of the tape through the machine.

Certainly slow motion is produced but with it come many defects most of which are attributable to the change in tape speed.

The magnitude of these defects will vary slightly from one design of recorder to another but the figures given for the Philips EL3400A may be considered typical. For this particular recorder operating on the 625 line TV Standard, the movement of the head during one field is 310 line pitches while the normal movement of the tape (referred to as K) during the same interval is in this example 2½ line pitches yielding the desired total of 312½ lines (K is also the field pitch cfr. FIGURE 6C). To take a hypothetical case:

Replay on same machine at ⅕ normal speed. The tape now moves only half of a line pitch per field.

Errors:

(1) The average number of lines per field is 310½ and not 312½. This is not admissible.

(2) The number of lines per field varies. In four out of five scans it is 310 lines and at the fifth it is 312½.

(3) Line frequency incorrect assuming mean field frequency is correct (i.e., 310½ lines instead of 312½).

(4) Field frequency modulated at 10 c./s. causing a vertical hopping of the picture (cfr. FIGURE 6C: e.g., there is a sudden jump in sync. timing from the 5th scan ($\alpha$) of track $t-1$ to the first scan ($\beta$) of track $t$ and so forth.

(5) Interlace seriously upset.

(6) Tracking impossible for uniform tape and head motion because the tracking angle is wrong and there is displacement normal to the track (cfr. FIGURE 6B).

This is obviously not suitable. It is possible to cure errors 1, 3 and to some extent 6 by using a slightly different replay machine, but other errors remain to be considered.

FIGURE 6A shows that the angle $\theta r$ at which a track was recorded across the tape (with tape helix angle $\theta t$) is dependent on the circumference of the drum and the relationship between head motion (AC) and tape motion (BC) giving a track AB at said track angle $\theta r$. If the speed of the tape is reduced by a factor of 5:1 (so that B only moves to B') to obtain slow motion playback then the head motion (and the circumference of the drum) is wrong and the readout head does not traverse the tape at the same angle as the recorded track.

It is an object of the invention to overcome these difficulties.

According to its broadest aspect the invention provides video tape reproducing apparatus for producing video signals for a slow motion picture from a tape recorded at normal speed (as defined) which apparatus comprises:

(a) Means for transporting tape at a constant speed which is a fraction $1/n$ of the original recording speed, $n$ being an integer;

(b) Means for scanning $n$ times in succession the recording which represents a given field;

(c) Means for causing the scans to track (as defined) the recording in spite of the change in tape speed;

(d) Means for causing the timing of successive field scans to be such that corresponding video information is scanned at substantially equal intervals of time.

The term "normal speed" refers to the original speed at which the tape was recorded. The term "to track" means broadly that a head of finite and practicable gap width can remain within the width of the recorded track during the whole of a scan running preferably (though not necessarily) parallel thereto.

Before describing actual embodiments of the invention it is desirable to describe partial applications of the invention as separate steps which have to be combined in a complementary manner.

First, with reference to feature (c), it will be seen from FIG. 6b that the tape helix angle $\theta t$ of the conventional recording arrangement can be changed to a value $\theta t'$ where the final position of point B' of the tape will be at the slit or scan path S—S (as desired) at the end of the scan period. This is done by rotating the tape round point A to a new (slow motion) tape position where B' lies on line S—S (point B′ is the position reached by element B of the tape due to tape motion at the 5:1 reduced speed, as was explained with reference to FIG. 6a).

This still leaves a discrepancy between the original head scan motion AC and the new (desired) head motion AB′. The head motion can be lengthened to the desired value AB′ by increasing the diameter of the head rotor and drum (with our previous assumptions this increase in rotor circumference will be in the ratio 312/310).

The errors of the previous hypothetical case that have been removed by this partial application of the invention are:

(1) The average number of lines per field is no longer 310½ but is now 312½ as desired.

(2) Both line and mean field frequency can be correct at the same time.

(3) The tape helix angle $\theta t$ is now correct but only one of the five scans (S3, FIG. 6d) can be made to track perfectly for a whole field. Two of the remainder (S2 and S4) will be so close as to be admissible. The remaining two (S1 and S5) will be problematical but may be made tolerable by decreasing the reproducing head track width to 90μ for a recording head of 120μ.

Errors remaining:

(1) The number of lines per field varies. It can be shown that in four out of five scans it is 312 lines, in the fifth scan it is 314½.

(2) Field frequency modulated at 10 c./s. causing a vertical hopping of the picture.

(3) Interlace seriously upset.

(4) Tracking displaced laterally in scans S1–S2, S4, S5 though angle is corrected (FIG. 6d).

By applying a further feature of the invention these lateral displacements of tracks can be overcome by using scanning means which comprise a plurality $n$ of heads which are rotatable together and are staggered along the axis of rotation, the stagger being obtained by disposing the heads substantially at equal distances along a single-start or multi-start helix, which in effect means disposing them approximately at equal arcs round the head rotor periphery with transverse (i.e. axial) stagger displacements substantially equal to a fraction $1/n$ of the recorded track width.

The stagger of the heads permits, for example, the center lines S1 to S5 of the five scans of FIG. 6d to be coincident. If they are also parallel to the tracks $t$, $(t+1)$ etc. due to other aforesaid features of the invention then the playback head may be substantially as wide as the recorded track.

For apparatus adapted for use with tape recorded on a helical machine of the type in which the tape passes round a cylindrical drum on a helical path and the resulting tape is such that each track corresponds to one field, the reproducing apparatus may have a scanning rotor of such diameter that each head traverses an effective scanning arc (as defined) which is longer than the effective scanning arcs used for the original recording to an extent such as to compensate for some of the above errors due to the $n$:1 reduction in tape speed (cfr. FIG. 6b).

The "effective scanning arc" is the arc which is traversed by a head between the instant when it is switched on by the circuitry of the apparatus and the instant when it is switched off.

The reduction in speed is preferably done by an odd ratio (e.g. 3:1 or 5:1) rather than by an even ratio (e.g. 4:1) for reasons which will appear below. The ratio 5:1 adopted in the examples has the added advantage of giving the slowest speed which can generally be adopted without destroying the illusion of motion (with a 50-field-per-second interlaced standard the 5:1 ratio gives 10 picture changes per second; similarly, a 60-field standard gives 12 picture changes per second).

In the case of slow-motion playback apparatus according to the invention having increased effective scanning arcs as aforesaid, the playback apparatus itself is preferably of the helical type in which case one preferred form has the following characteristics:

(a) It is adapted for use with tape based on interlaced fields each containing $x+½$ lines where $x$ is an integer;

(b) It employs $n$ (where $n$ is an odd number) scanning heads adapted to rotate at such speed that each head scans one track in one field period, the heads being employed in the order 1, 2, 3 . . . $n$;

(c) The arcs of separation (as defined) between successively used heads alternate between $x$ and $(x+1)$ lines except between heads $n$ and 1 where said spacing is $(x+½\pm K)$ lines where K is the displacement (as defined) between field pulses of successive recorded tracks expressed in lines, this quantity K being an odd number of half lines;

(d) The pitch of the helix described by passage of the tape over the drum is related to that used originally in recording the tape in that the slow-motion helix pitch is given by the original tape helix pitch of a single-head recording machine multiplied by the ratio of the angular speed of rotation of said single-head recorder to that of the slow-motion rotor.

The said ratio is almost exactly equal to the ratio of the playback drum diameter to the single-head recording drum diameter. (If the tape used had been recorded e.g. on a two-head machine with a drum of twice the diameter, suitable allowance must, of course, be made in the calculation.)

The "arcs of separation" are the arcs which are measured between one head and the next one to be used and represent the geometry of the disposition of the heads on a rotor. These arcs are of similar length to, and may or may not be exactly the same as, the corresponding "effective scanning arcs" depending on circumstances.

Alternatives to the small differences in the lengths of arc in this last arrangement can be used (e.g. delay lines, as will be explained later) but first some examples of such an arrangement, taken as preferred embodiments of the invention, will now be described by way of example with reference to the accompanying drawings as applied to 5:1 speed reductions in an interlaced system using helical machines and helical recordings.

Figure 2:
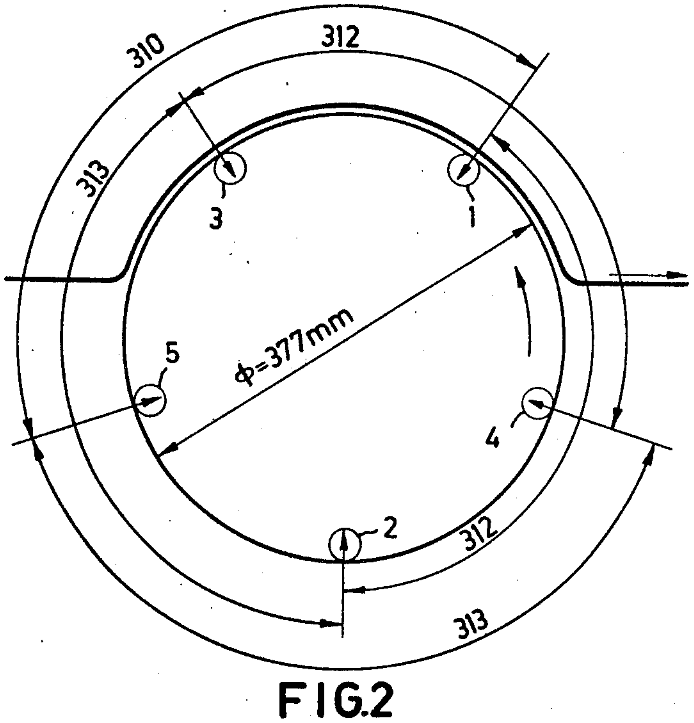

FIGURE 2 has the five heads arranged in sequence $\underline{1}$, 4, $\underline{2}$, 5, $\underline{3}$; 1, $\underline{4}$, 2, $\underline{5}$, 3; $\underline{1}$ and used in the order underlined, the speed of rotation in revolutions per second is equal to $F\times 2/5$ where F is the field frequency, and the circumference of the drum equals 5/2 arcs of separation.

Figure 3:
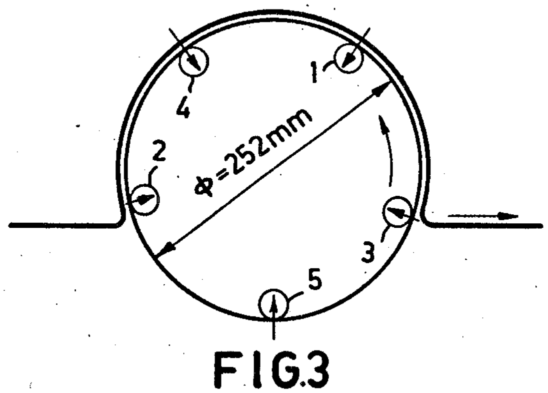
Figure 6A:
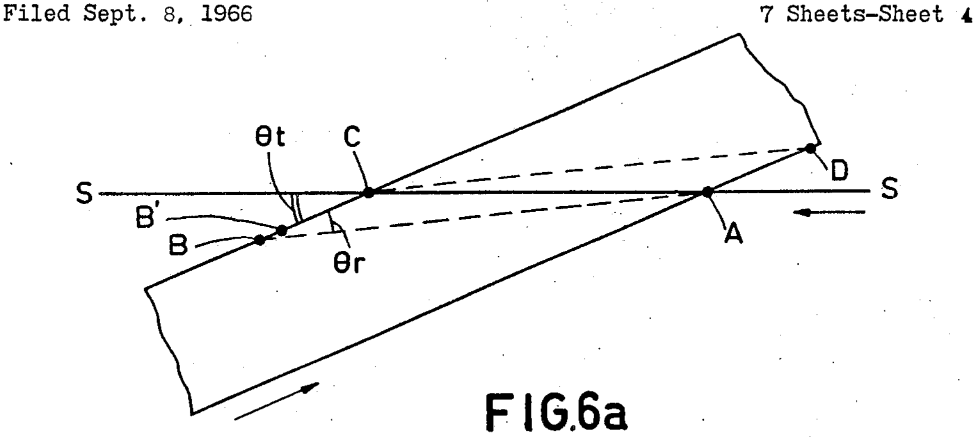
Figure 6B:
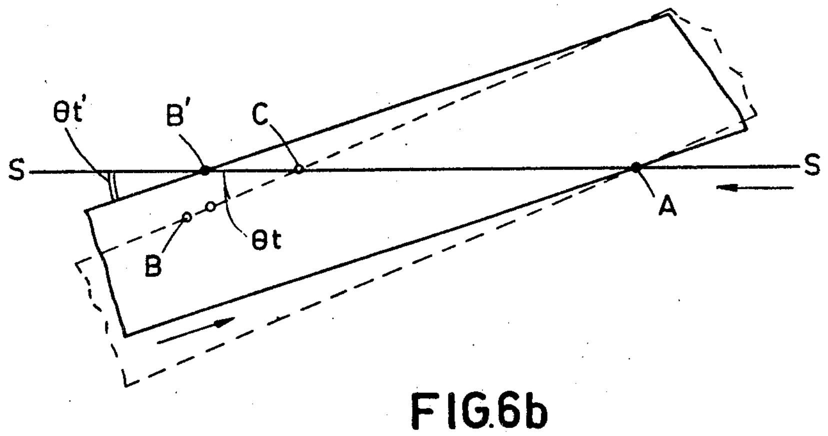
Figure 6C:
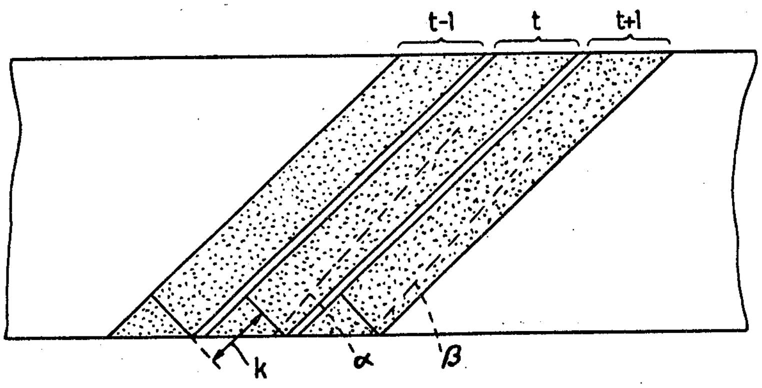
Figure 6D:
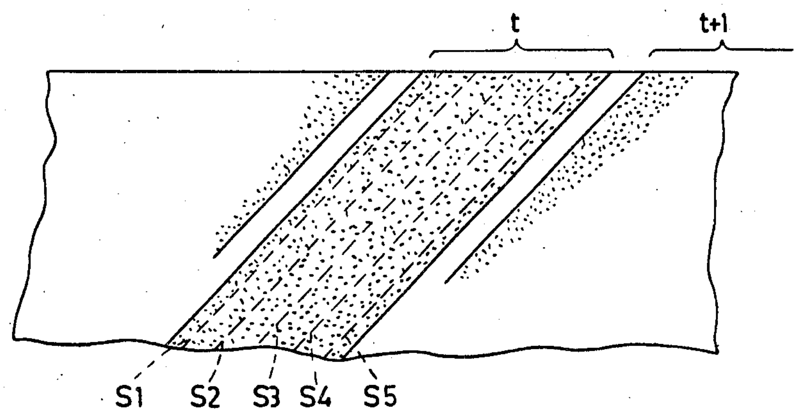

FIGURE 3 has the five heads arranged in sequence $\underline{1}$, 3, 5, $\underline{2}$, 4, 1, $\underline{3}$, 5, 2, $\underline{4}$, 1, 3, $\underline{5}$, 2, 4, $\underline{1}$ and used in the order underlined, the speed of rotation in revolutions per second is equal to $F\times 3/5$ where F is the field frequency and the circumference of the drum equals 5/3 arcs of separation.

Figure 4:
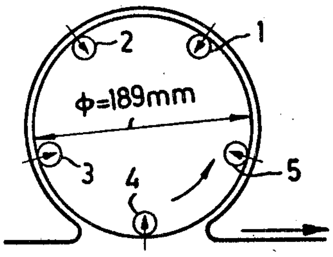
FIGURES 2 to 4 show arrangements in which the arcs of separation (between consecutively used heads) overlap so as to reduce the diameter of the rotor and drum. In particular.

FIGURE 4 has the five heads arranged in sequence $\underline{1}$, 5, 4, 3, $\underline{2}$; 1, 5, 4, $\underline{3}$, 2; 1, 5, $\underline{4}$, 3, 2; 1, $\underline{5}$, 4, 3, 2; $\underline{1}$, and used in the order underlined the speed of rotation in revolutions per second is equal to $F4/5$ where F is the field frequency, and the circumference of the drum equals 5/4 arcs of separation.

Figure 5:
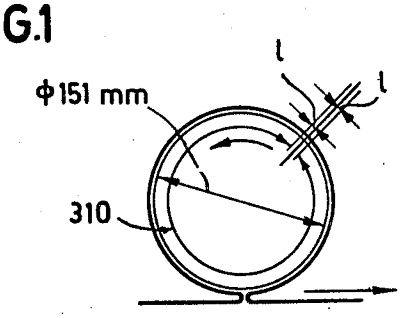

FIGURE 5 shows a modification of the arrangements of FIGURES 1 to 4 wherein all the heads are almost at the same position on the drum periphery.

FIGURES 1A to 4A show rotor developments indicating the particular staggered arrangement of the heads of FIGURES 1 to 4 respectively.

Figure 5A:
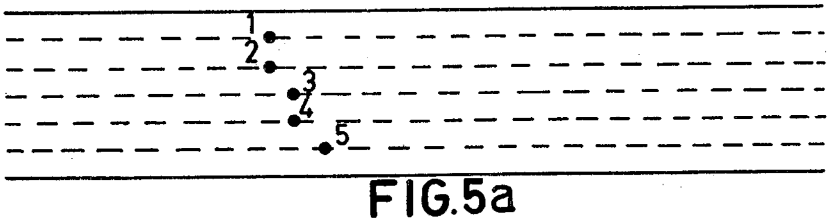
Figure 5B:
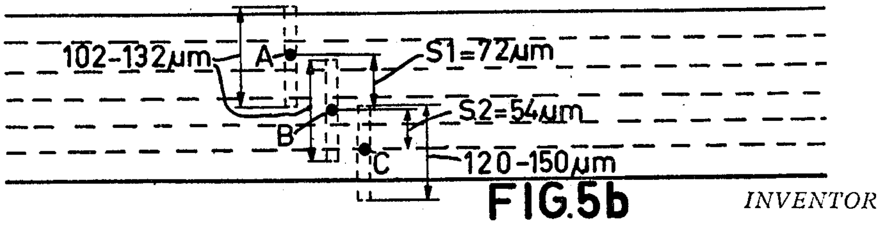

FIGURES 5A–5B show similar developments for the arrangement of FIGURE 5, FIGURE 5A being theoretical while FIGURE 5B is possible though difficult to achieve with present technology.

FIGURES 6A to 6D are diagrams which have already been used in the preliminary explanations.

Figure 7:
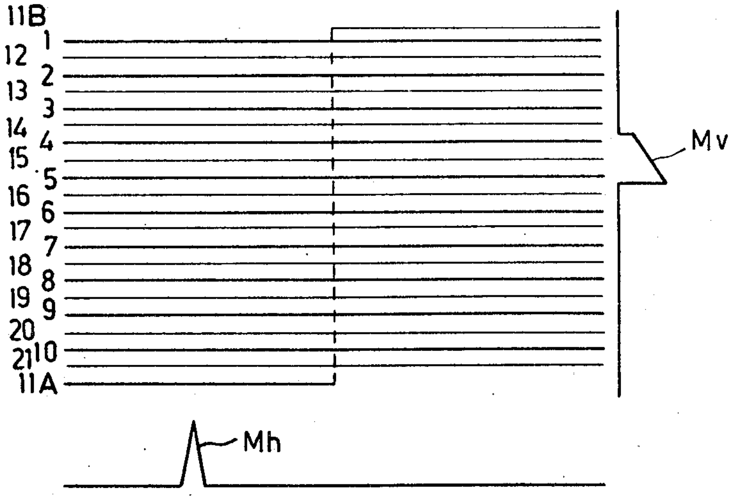

FIGURE 7 shows a simplified interlaced raster with an elementary form of modulation.

FIGURES 8*a*–8*d* show schematic video waveforms related to said raster.

Figure 9:
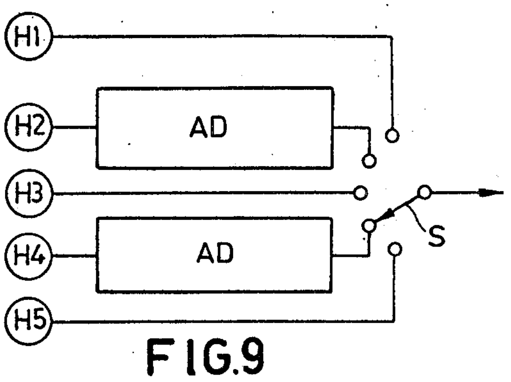

FIGURE 9 shows a head-switching circuit employing delay lines to achieve interpolation of field information.

Figure 10:
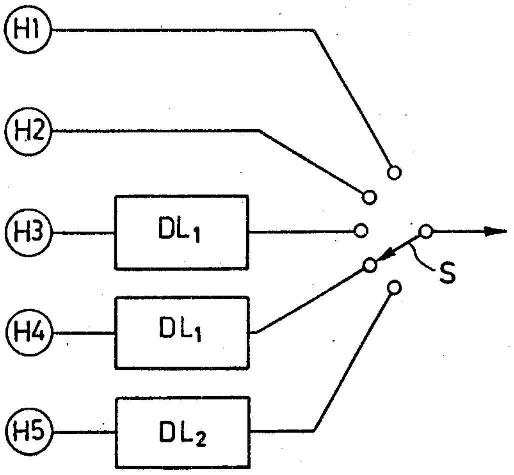

FIGURE 10 shows a head-switching circuit employing delay lines to replace the small differences in the arcs between the heads of FIGURES 1 to 4.

The standard assumed (for convenience) is the 625-line standard.

In FIGURES 1 to 4 inclusive the heads are substantially evenly spaced about the circumference of the drum while in FIGURE 5 they are very close together or approximately at a common position. There are many similarities in the solutions of FIGURES 2 to 4 and these will be treated together.

Some specific comments should be made on the constructions of FIGURES 1 to 5.

FIGURE 1:

There is the problem of the size of the drum which has to be 755 mm. in diameter. Switching from the output of one head to the next can readily be done by known circuit means. The tape should be wrapped round the drum to an extent somewhat greater than about 72° (as shown) owing to the stagger of the heads though it could be wrapped right round the drum on a conventional helical path if desired.

In the present example the arc of separation between heads 5 and 1 is 310 lines because the field pitch K has been assumed to be 2½ lines and the direction of movement of the heads is opposite the direction of movement of the tape. Should the latter not be the case the said arc of separation is 315 lines.

The one physical parameter which is not defined in the drawing is the pitch of the tape helix, i.e. the helix which the tape would define if it were wrapped once right round the drum instead of embracing only about ⅕ of the drum. As defined previously, this pitch is obtained by taking the original tape helix pitch of a corresponding single-head recorder (diameter 150 mm.) and multiplying it by 5. The value 5 can be taken as the ratio of recording rotor angular speed to playback rotor angular speed or it can be taken as a nominal increase in the drum circumference (this nominal increase in the drum has been made to differ slightly from the actual increase so as to obtain correct tracking angle).

Figure 1:
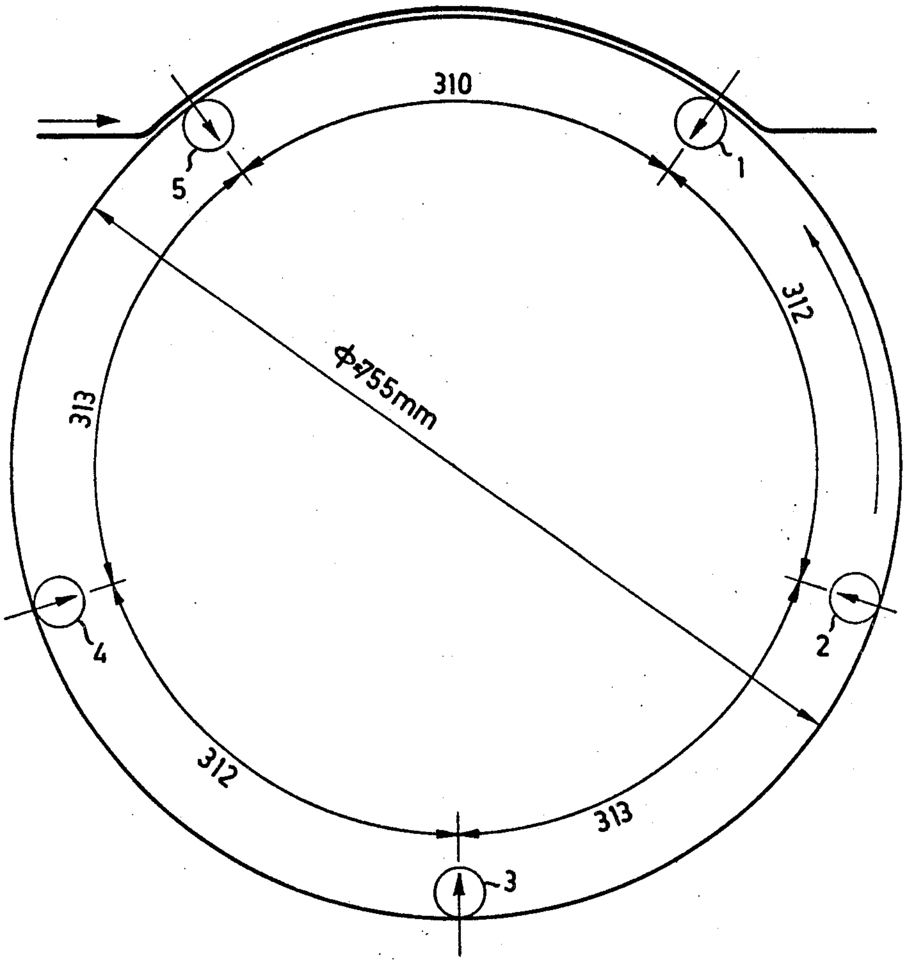
FIGURE 1 shows an arrangement in which the head rotor and drum are increased approximately 5 times in circumference.
Figure 1A:
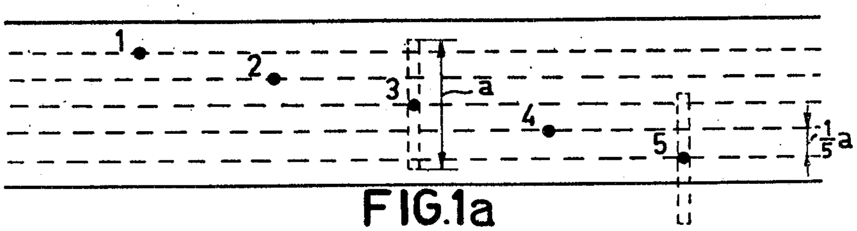
Figure 2A:
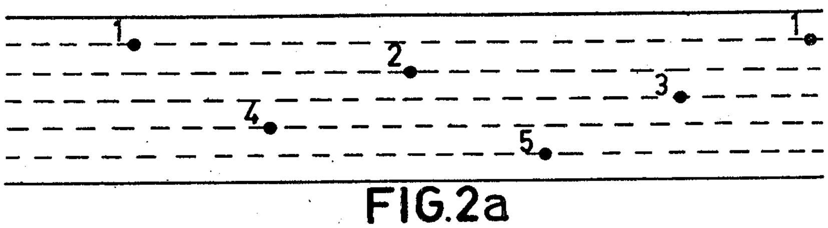
Figure 3A:
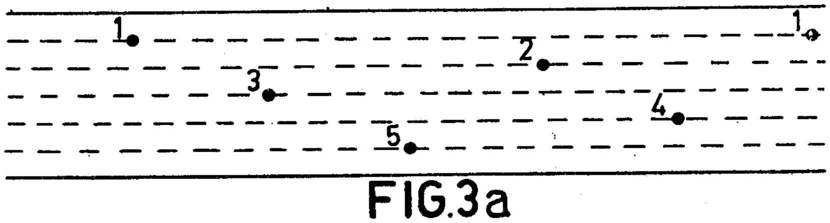
Figure 4A:
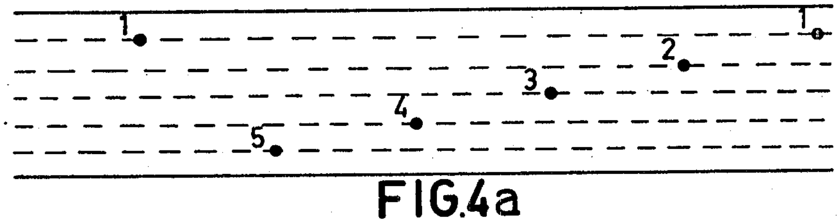

As shown in FIGURE 1A, the centers of the heads 1–5 are staggered transversely by ⅕ of track pitch *a* (for example 36$\mu$ with a gap width of 120–150$\mu$) and lie on a single-start helix.

FIGURES 2–4 inclusive:

In these cases the drum diameter has a more convenient size. Since, again, the tape need not be wrapped completely round the drum the problem of connecting the two component parts of the drum is easily solved. Head switching requires more complicated circuitry than FIGURE 1. Since the head wheel rotates 2, 3 or 4 revolutions in 5 fields, the generation of five impulses per revolution together with a counter circuit provides a method of stabilizing and controlling the speed of rotation. It may also be necessary to consider ambiguity of position. The probable choice is the arrangement of FIGURE 4 unless the size of the drum is regarded as too small for the five preamplifiers and switching circuits.

In a manner analogous to FIGURE 1, the pitch of the tape helix is related to the original single-head recording helix by the factor 5⁄2 (FIGURE 2) or 5⁄3 (FIGURE 3) or 5⁄4 (FIGURE 4).

As shown in FIGURES 2A–3A–4A the head centers are staggered e.g. by 36$\mu$; in 2 of these cases they lie on multi-start helices.

FIGURE 5:

This modification of the invention is in many ways the most interesting. It has some distinct advantages over the other solutions but it also has its own problems.

The major problems are that heads 1 and 2 (and also 3 and 4) have to partially occupy the same space (cfr. FIG. 5*a*). With a track width of 120–150 $\mu$m. the lateral displacement between centers of adjacent heads is only 36 $\mu$m. It is possible to turn this to advantage by using one reproducing head with a width of 100 $\mu$m. to perform the functions of both heads 1 and 2 (head A of FIGURE 5B). Another such head (head B of FIGURE 5B) can perform the functions of heads 3 and 4. A third head (C) will then be required as head 5. This cuts down the number of heads from five to three and also cuts down the number of pre-amplifiers and switches. During the second pass of head A, head B will be producing the same signal delayed by one line and similarly, at the second pass of head B, head C will be producing a signal delayed one line from that of head B. This is because the 3 heads are spaced apart (peripherally) by 1 line over a distance 1, as shown. The circumference of the drum is 312 lines.

The arcuate separation of the head gaps (which is approximately 1.5 mm.) has to be held to a tolerance of about 5$\mu$. This error needs a switchable delay line of 0.2 $\mu$s. for compensation. The required theoretical accuracy is about 0.03 $\mu$s. The lateral displacement from one head to the next should be about 60$\mu$ in this case. The tracking errors in $\mu$ produced due to this geometry are as follows:

HEADS

| Field: | A | B | C |
|---|---|---|---|
| 1 | +12 | | |
| 2 | −24 | +36 | |
| 3 | | 0 | |
| 4 | | −36 | +24 |
| 5 | | | −12 |

The errors are insignificant when one head is used along but become significant (though small) when two heads are in use (e.g. for interpolation as explained later). Under these latter conditions beats can be reduced by 6 db and noise by 3 db due to the fact that each head produces only half the output signal. A great advantage of the arrangement of FIGURE 5 is that the head wheel rotates once per field which considerably simplifies the head wheel servo system.

To sum up the geometry of FIGURES 1 to 5, the arcs of separation of the heads are tabulated for convenience and are common to all FIGURES 1–5:

Separation head 1–head 2—312 lines
Separation head 2–head 3—313 lines
Separation head 3–head 4—312 lines
Separation head 4–head 5—313 lines
Separation head 5–head 1—310 lines (312.5—2.5)

The sum of all these arcs is 1560 lines.

Before embarking on the further description it is desirable to restate certain requirements of the present system which are:

(a) To be able to repeat a field a desired number of times ($n$) and then change to repeating the next field in sequence the same desired number of times and to carry on this process as long as is likely to be required.

(b) To enable the picture to comply with the normal television standards it is necessary to be able to change an odd field into an even field or vice versa whenever required.

This later requirement could have been obviated by repeating frames rather than fields but where there is rapid movement (and there is little likelihood of a demand for slow motion if the original movement is not rapid) repeated frames produce a double image of the subject or its background, whereas repeated fields produce a much smoother effect.

Changes from odd to even can be effected as follows. The information on a particular line of one field is very similar to the adjacent lines on the next field, i.e. the line above and the line below. The timing of these lines is half a line before or half a line later. If on alternate fields we advance the picture in time by half a line period, the information on the picture is lifted by one raster line. Vertical lines in the picture are not adversely affected but horizontal lines jump up and down at frame rate. This is objectionable. The same thing happens if the repeated field is delayed by half a line period when we wish to change the type of field, the only difference being that in this case the picture drops by one raster line. This disadvantage may be avoided by using neither a half line advance nor a half line delay but the mean of both signals. This may be made more obvious by considering two adjacent lines on one field, say lines 99 and 101. On the next field for line 100 we could use line 101 by producing a half-line advance or we could use line 99 using a half line delay but the correct solution would obviously be to use an equal mixture of the two, since line 100 lies immediately between lines 99 and 101.

This will be understood more clearly from FIGURES 7 and 8. Let us consider a simplified case where the original recording machine moves the tape at a speed such that the displacement between tracks is 2½ lines and a 21-line picture as shown in FIGURE 7 is to be reduced in speed by 5:1. The picture includes for convenience a graded bright horizontal bar extending right across and represented by vertical modulation $Mv$ (on lines 4, 15 and 5) and a thin bright vertical bar extending from top to bottom and represented by horizontal modulation $Mh$. The later bar is indicated as a spike in the graphs of FIGURE 8.

Figures 8A, 8B, 8C, 8D:
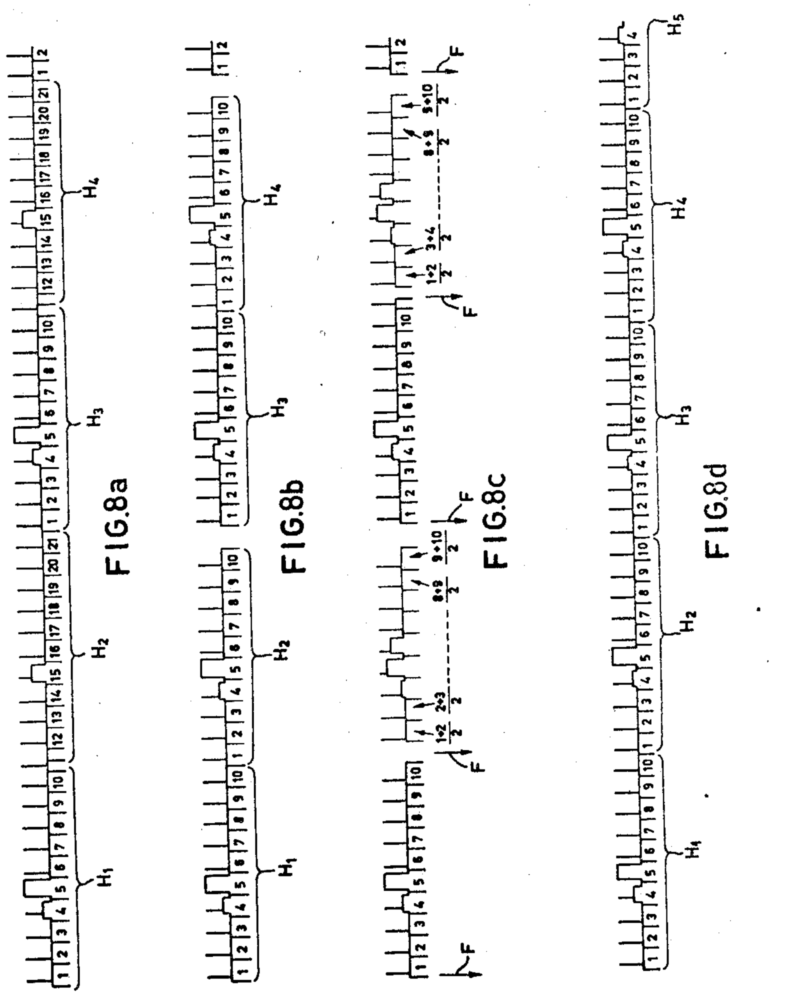

Evidently it is desirable that the output signal should closely resemble that shown in FIG. 8*a*. If the repetitive scanning of the first (odd) field of FIGURE 8A by five heads $H_1$–$H_5$ is considered it would instead provide the same modulation both on the odd and the artificial "even" lines (FIGURE 8B). In FIGURE 8 field pulses are not shown because the necessary displacement for interlace requires the field synchronizing pulses to be reformed. In other words, since it has been arranged that the line information is continuous, the recorded field sync information must be removed and true interlaced field sync pulses generated and inserted to give the desired alteration of odd and even fields.

It may be seen from FIGURE 8B that at all times the read-out from heads 1, 3 and 5 ($H_1$, $H_3$ and $H_5$) contains the desired picture information, whereas the read-out from heads 2 and 4 ($H_2$ and $H_4$) (whilst being correctly timed as regards line information) contains field information which is incorrect, this being implicit in trying to convert from even to odd fields or vice versa. A better approximation to the desired signal can be obtained by taking the signals from heads 2 and 4 and processing them in the following way:

One-half of the signal is taken and mixed with one-half of the signal which has been delayed by one line thus given a signal which is interpolated in the vertical direction in the units AD. This can be done by a switching circuit which includes delay lines and attenuators and a head selecting switch S, e.g. as shown schematically in FIGURE 9. It assumes that information appearing on line 15 is the average of that appearing on lines 4 and 5. Reference to FIGURE 7 shows this to be a reasonable assumption and it gives the waveform shown in FIG. 8*c*, in which F indicates the required field pulse position.

At this point it may be worth summing up the operation of the arrangements described.

Maintaining the assumption that the head and tape move in opposite directions, which as such is not necessary, the common part of all solutions is a first head scanning a track and, when it has effectively passed 312 lines of information, a second head starts scanning the same track. During the second head scan we can either tolerate the picture information jumping up one line or we can use a one-line delay to permit an interpolation of picture information.

After the second head has effectively passed 313 lines of information a third head starts its scan and in turn, after 312 lines have been effectively traversed, a fourth head comes into operation. The signal from the fourth head is treated in the same way as that from the second head. Again, as in the case of the second head, after 313 lines of information have been effectively passed a fifth head comes into operation scanning this track for the last time.

After the fifth head has effectively scanned 312½ lines, the first head is at the correct point to begin its scan of the next track in sequence. Since the information on this track is displaced by 2½ lines (factor K) the arc of separation between head 5 and head 1 is only 310 lines. Should the direction of movement of the heads be the same as the direction of movement of the tape, this last arc of separation is 315 lines.

The emphasis has been on an odd number of repetitions of one field. A further reason for this is that, not only does one have to change a smaller percentage of the fields from odd to even or vice versa, but the pattern of this change is the same every time. For example, if the slow motion is 5 to 1 the pattern is as follows:

| Number of field | 1 | 2 | 3 | 4 | 5 | 6 | 7 | 8 | 9 | 10 |
|---|---|---|---|---|---|---|---|---|---|---|
| Desired to be | Odd | Even | Odd | Even | o | e | o | e | o | e |
| Incoming field | | | Odd | | | | | Even | | |
| Change required on fields | – | x | – | x | – | – | x | – | x | – |

In this case only the second and fourth of every five repeats have to be changed.

Consideration will now be given to certain alternatives to the arrangements of FIGURES 1 to 5.

It may be desirable (e.g. from a manufacturing point of view) to place the five heads equally spaced (at 72°) on the head wheel. If this is done the read-out will be as shown in FIGURE 8D.

It will be seen that only heads 1 and 2 give information out which is timed in the way that is desirable i.e. as in FIGURE 8B. In order to bring the other signals to a suitable timing it is necessary to delay the signal from heads 3 and 4 by one line duration and that of head 5 by two lines duration. This can be done by a switching circuit employing delay lines $DL_1$ and $DL_2$ as shown in FIGURE 10.

In conclusion, delay lines can be used for 3 purposes: (a) to obtain interpolation of field information as described above (FIGURE 9); (b) to adjust the timing of the head signals when the angles between heads are equal (as described above with reference to FIGURE 10); (c) to take out small errors due to mechanical tolerances in head position (e.g. a 0.2 $\mu$s. adjustable delay may be provided in the output circuit of each head). These arrangements (a), (b), (c) may be used in any combination desired and arrangement (a) (FIGURE 9) can be combined with the irregular head arc arrangements of FIGURES 1 to 5.

What is claimed is:

1. Apparatus for producing video signals for a slow motion picture from a tape recorded at normal speed on a helical machine of a type wherein the tape passes before a rotated recording head around a cylindrical drum on a helical path, wherein each track corresponds to one field, and wherein the video information is recorded in interlaced fields each containing $X+\frac{1}{2}$ lines, where X is an integer, comprising means for transporting the tape at a constant speed $1/n$ times the original recording speed, a scanning rotor, $n$ reproducing heads disposed on said rotor at substantially equal distances along a helical path, said rotor having a diameter such that each head traverses a longer effective scanning arc than the effective scanning arcs used in the original recording, means for rotating the heads and rotor at such a speed that each head scans one track in one field period in the order 1, 2, 3 . . . $n$, the arcs of separation between successive scanning heads alternating between X and $X+1$ lines except between heads $n$ and 1 where the spacing is $X+\frac{1}{2}\pm K$ where K is the displacement between field pulses of successive recorded tracks expressed in lines, wherein K is an odd number of half lines, and wherein the tape is passed over the rotor and reproducing heads at an angle equal to the corresponding angle of the recording apparatus multiplied by the ratio of the angular speed of rotation of the recording head to the rotational speed of the reproducing rotor.

2. Apparatus as claimed in claim 1, wherein the arcs of separation are arranged to overlap.

3. Apparatus as claimed in claim 2, wherein $n=5$, the five heads being arranged in the sequence $\underline{1}$, 4, $\underline{2}$, 5, $\underline{3}$; 1, $\underline{4}$, 2, $\underline{5}$, 3; $\underline{1}$ and used in the order underlined, wherein the speed of rotation in revolutions per second is equal to $F\times\frac{2}{5}$ where F is the field frequency, and wherein the circumference of the drum equals $\frac{5}{2}$ arcs of separation.

4. Apparatus as claimed in claim 2, wherein the five heads are arranged in the sequence $\underline{1}$, 3, 5, $\underline{2}$, 4, 1, $\underline{3}$, 5, 2, $\underline{4}$, 1, 3, $\underline{5}$, 2, 4, $\underline{1}$ and used in the order underlined, wherein the speed of rotation in revolutions per second is equal to $F\times\frac{3}{5}$ where F is the field frequency, and wherein the circumference of the drum equals $\frac{5}{3}$ arcs of separation.

5. Apparatus as claimed in claim 2, wherein the five heads are arranged in the sequence $\underline{1}$, 5, 4, 3, $\underline{2}$; 1, 5, 4, $\underline{3}$, 2; 1, 5, $\underline{4}$, 3, 2; 1, $\underline{5}$, 4, 3, 2; $\underline{1}$, and used in the order underlined, wherein the speed of rotation in revolutions per second is equal to $F\times\frac{4}{5}$ where F is the field frequency, and wherein the circumference of the drum equals $\frac{5}{4}$ arcs of separation.

6. Apparatus as claimed in claim 1, wherein electrical delays are included in the circuits of appropriate heads to effect interpolation of the video information when converting an even field into an odd field or vice versa and wherein $n$ is chosen to be an odd number so that such conversion of field type occurs always at the same heads.

7. Apparatus as claimed in claim 6 wherein $n=5$ and wherein the conversion occurs always at heads 2 and 4.

References Cited

UNITED STATES PATENTS

| | | |
|---|---|---|
| 3,359,365 | 12/1967 | Kihara. |
| 3,095,473 | 6/1963 | Roizen. |
| 3,157,738 | 11/1964 | Okamura. |
| 3,168,618 | 2/1965 | Sondermeyer. |
| 3,229,035 | 1/1966 | Bounsall. |
| 3,375,331 | 3/1968 | Okazaki. |
| 3,376,395 | 4/1968 | Rumple. |
| 3,395,248 | 7/1968 | Suzuki. |

ROBERT L. GRIFFIN, Primary Examiner

JOSEPH A. ORSINO, Jr., Assistant Examiner

U.S. Cl. X.R.

179—100.2